3,812,113
SILICON SUBSTITUTED AZASPIRANES
Leonard M. Rice, Columbia, Md., assignor to Geschickter Fund for Medical Research, Washington, D.C.
No Drawing. Continuation-in-part of abandoned application Ser. No. 6,561, Jan. 28, 1970. This application Sept. 8, 1971, Ser. No. 178,827
Int. Cl. C07d 27/04
U.S. Cl. 260—240 R  4 Claims

ABSTRACT OF THE DISCLOSURE

Novel azaspiranes containing silicon, their acid addition and bis-quaternary salts, as well as intermediate azaspirodiones. The azaspiranes are particularly useful for their cytotoxic activities.

CROSS REFERENCE TO RELATED APPLICATION

This is a continuation-in-part of Ser. No. 6,561, filed on Jan. 28, 1970, now abandoned.

SUMMARY OF THE INVENTION

The present invention relates to novel heterocyclic nitrogen compounds. More specifically, this invention relates to silicon substituted azaspiranes and to their acid addition and bis-quaternary salts.

The bis-quaternary salts of these compounds exhibit antihypertensive activity and are particularly useful in blocking ganglionic activity in dogs and other animals.

The novel compounds of this invention may be represented by the following general formula:

$$R^1 \diagdown \atop R^2-Si-CH \diagup \atop R^3 \diagup \quad \begin{matrix} CH_2-CH_2 \\ \diagup \quad \diagdown \\ \diagdown \quad \diagup \\ CH_2-CH_2 \end{matrix} C \begin{matrix} CH_2-CH_2 \\ \diagup \quad \diagdown \\ \diagdown \quad \diagup \\ CH_2-N-(R^4)_y-N \end{matrix} \diagdown_{R^6}^{R^5}$$

wherein:

$R^1$, $R^2$ and $R^3$ are the same or different methyl or ethyl groups
$R^4$=alkylene or alkenylene
$R^5$ and $R^6$ are the same or different lower alkyls having 1–4, preferably 1–3, carbon atoms, lower alkenyls having 3–4 carbon atoms, or cyclized together form a heterocyclic group selected from morpholino, pyrrolidino, piperidino and lower alkyl (1–4 carbon atoms) piperazino in which said lower alkyl is attached to a terminal nitrogen atom
$y$=2–6, preferably 2–3, when $R^4$ is alkylene and 3–4 when $R^4$ is alkenylene

DETAILED DESCRIPTION OF THE INVENTION

The novel compounds of this invention may be formed from dione precursors such as disclosed in aforementioned Ser. No. 6,561, filed Jan. 28, 1970, now abandoned.

In a particularly preferred embodiment of this invention, a compound of the following formula is prepared in a five step reaction.

$$(CH_3)_3Si-CH \begin{matrix} CH_2-CH_2 \\ \diagup \quad \diagdown \\ \diagdown \quad \diagup \\ CH_2-CH_2 \end{matrix} C \begin{matrix} CH_2-CH_2 \\ \diagup \quad \diagdown \\ \diagdown \quad \diagup \\ CH_2-N \end{matrix} \begin{matrix} | \\ CH_2 \\ | \\ CH_2 \diagdown \\ | \quad \quad CH_3 \\ CH_2-N \diagup \\ \diagdown CH_3 \end{matrix}$$

In the first step of this reaction para-trimethylsilylcyclohexanone is condensed with ethyl cyanoacetate to produce ethyl - 4 - trimethylsilylcyclohexylidenecyano acetate and water. This reaction is carried out in an organic solvent, for example, benzene or toluene, and in the presence of acetic acid and ammonium acetate as catalysts. The reaction is carried out, for example, at reflux temperature for time periods ranging from 2 hours to 24 hours.

In the second reaction step the ethyl-4-trimethylsilylcyclohexylidenecyano acetate from the first reaction step is converted to a dinitrile by treatment with potassium cyanide and then hydrolyzed by refluxing with concentrated hydrochloric acid to produce 4-trimethylsilylcyclohexane-1-carboxy-1-acetic acid. The dinitrile reaction is carried out, for example, in an organic solvent such as ethyl alcohol. It is conveniently carried out at reaction temperatures ranging from 20° C. to 30° C. and reaction times ranging from 12 hours to 36 hours.

In the third reaction step the carboxylated product of the second reaction step is refluxed with an anhydride such as acetic anhydride to produce the anhydride of the second step carboxylated product and acetic acid. This reaction is carried out over time periods ranging from 15 minutes to 4 hours.

In the fourth reaction step the anhydride product from the third reaction step is reacted with dimethylaminopropylamine to produce N-dimethylaminopropyl-8,8,8-trimethyl-8-silyl-2-azaspiro[5:4]decane-1,3-dione and water. This reaction is carried out at temperatures ranging from 150° C. to 200° C. over reaction times ranging from 30 minutes to 2 hours. No solvent need be utilized.

The dione product from the above reaction step is converted in the fifth reaction step into the final product cytotoxic agent by reacting it with a reducing agent such as lithium aluminum hydride. The reaction is advantageously carried out utilizing anhydrous ether as a solvent. The five step reaction is illustrated by the following reaction equations:

Step 1:

$$(CH_3)_3Si-CH \begin{matrix} CH_2-CH_2 \\ \diagup \quad \diagdown \\ \diagdown \quad \diagup \\ CH_2-CH_2 \end{matrix} C=O + CNCH_2COOC_2H_5 \longrightarrow$$

$$(CH_3)_3Si-C \begin{matrix} CH_2-CH_2 \\ \diagup \quad \diagdown \\ \diagdown \quad \diagup \\ CH_2-CH_2 \end{matrix} C=\overset{CN}{\underset{|}{C}}-COOC_2H_5 + H_2O$$

(I)

Step 2:

$$(I) + KCN \xrightarrow{HCl} (CH_3)_3Si-CH \begin{matrix} CH_2-CH_2 \\ \diagup \quad \diagdown \\ \diagdown \quad \diagup \\ CH_2-CH_2 \end{matrix} C \begin{matrix} CH_2COOH \\ \diagdown \\ COOH \end{matrix}$$

(II)

Step 3:

$(II) + (CH_3CO)_2O \longrightarrow$ $$(CH_3)_3Si-CH \begin{matrix} CH_2-CH_2 \\ \diagup \quad \diagdown \\ \diagdown \quad \diagup \\ CH_2-CH_2 \end{matrix} C \begin{matrix} CH_2-C=O \\ \diagdown \\ C-O \\ \parallel \\ O \end{matrix} + 2CH_3COOH$$

(III)

Step 4:

$(III) + (CH_3)_2N-CH_2-CH_2-CH_2-NH_2 \longrightarrow$ $$(CH_3)_3Si-CH \begin{matrix} CH_2-CH_2 \\ \diagup \quad \diagdown \\ \diagdown \quad \diagup \\ CH_2-CH_2 \end{matrix} C \begin{matrix} CH_2-\overset{O}{\overset{\parallel}{C}} \\ \diagdown \\ C-N \\ \parallel \quad | \\ O \quad CH_2 \\ \quad | \\ \quad CH_2 \\ \quad | \\ \quad CH_2 \\ \quad | \\ \quad N(CH_3)_2 \end{matrix}$$

(IV)

Step 5:

$(IV) + LiAlH_4 \longrightarrow$

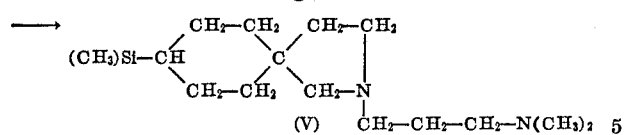

In addition to the novel silicon-containing azaspiranes disclosed herein, the present invention contemplates the conversion of these compounds into their pharmaceutically acceptable, nontoxic acid addition and bis-quaternary salts. Such salts of azaspiranes may be represented by the following formula:

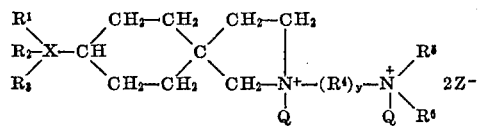

wherein $R^1$, $R^2$, $R^3$ $R^4$, $R^5$, $R^6$, $y$ and $X$ have the same values as previously indicated. In all cases Q is either hydrogen, lower alkyl of 1–4 carbon atoms or alkenyl of 3–4 carbon atoms and Z is a non-toxic pharmaceutically acceptable anion such as methiodide, chloride, acetate, bromide, sulfate, perchlorate, mucate, succinate, citrate, phosphate, and the like. In general, those non-toxic salts which are soluble in water or other well tolerated solvents are particularly useful for therapeutic purposes due to the ease of administration of the salts in their dissolved form. However, other non-toxic salts may be used for such purposes also.

The free bases and their acid addition salts produce cytotoxic effects on human tissue cultures of lymphosarcoma, prostate cancer, and breast cancer in the range of about 1–5 gamma per ml. of culture, or less. Also, as previously indicated, the bis-quaternary salts of the free bases have gangliophlegic properties and produce ganglionic blockages in varying degrees of sympathetic and parasympathetic ganglia.

The following examples will further illustrate the invention.

EXAMPLE 1

This example illustrates the formation of a silicon substituted precursor for the azaspirodiones of this invention.

Preparation of para-trimethylsilylcyclohexanone

Para-trimethylsilylcyclohexanone is prepared starting with paratrimethylsilylphenol (Speier, J. L., J. Am. Chem. Soc. 74, pages 1007–1008 (1952)) by converting the phenol to its corresponding cyclohexanol and oxidizing the cyclohexanol to its corresponding cyclohexanone as follows:

200 g. (1.2 moles) of p-trimethylsilylphenol was placed in a 2-L bomb together with 1-L of isooctane as a solvent and 6 g. of 5% rhodium-on-alumina catalyst. The apparatus was charged with 1,000 lbs. per square inch of hydrogen and the temperature was raised to 80° C. After 4 hours the bomb was allowed to cool to room temperature. At this point, the reaction mixture was removed from the bomb and filtered to remove catalyst. Solvent was then removed from the filtrate by distillation. The resulting solution was then distilled, and 179 g. having a boiling point ranging from 117° C.–119° C. at 22 mm. Hg pressure was obtained. This product contained by weight 56% para-trimethylsilylcyclohexanone and 44% para-trimethylsilylcyclohexanol.

To a solution of 39.1 g. (0.226 moles) of the above reaction product dissolved in 300 ml. of diethyl ether was slowly added a solution of 22.5 g. of sodium dichromate and 17 ml. of sulfuric acid dissolved in 100 ml. of water. This addition was carried out over a 1 hour period. During this addition the temperature was maintained at 10° C. with stirring. At the conclusion of the addition, the mixture was stirred at room temperature for 12 hours. At this point, the ether layer was separated and washed successively with 100 ml. of water, 100 ml. of saturated sodium bicarbonate solution and 100 ml. of saturated salt solution. The resulting washed product was dried over anhydrous sodium sulfate. Diethyl ether was removed from the dried product by distillation. The residue was vacuum distilled to give 30 g. of substantially pure para-trimethylsilylcyclohexanone having a boiling point of 104° C. at 12 mm. Hg pressure.

EXAMPLE 2

Preparation of N-dimethylaminopropyl-8,8,8-trimethyl-8-silyl-2-azaspiro-[5:4]decane-1,3-dione N - dimethylaminopropyl - 8,8,8 - trimethyl-8-silyl-2-azaspiro[5:4]decane-1,3-dione was prepared by the following four step reaction starting with the cyclohexanone prepared in Example as follows:

To a benzene (200 ml.) solution of 24 g. of 4-trimethylsilylcyclohexanone prepared in Example 1 was added 16 g. of ethyl cyanoacetate, 0.85 g. of acetic acid, and 0.6 g. of ammonium acetate. The resulting mixture was refluxed in a flask equipped with a water trap for 5 hours. This mixture was then poured into 1,000 ml. of water at room temperature. The water and organic phases were then separated. The organic phase was then washed successively with 200 ml. of water, 200 ml. of saturated sodium bicarbonate solution, and 200 ml. of saturated salt solution. The washed product was then dried utilizing anhydrous sodium sulfate. The residue was distilled to produce 31.0 g. of substantially pure ethyl-4-trimethylsilylcyclohexylidenecyano acetate having a boiling point of 110° C.–117° C. at 0.0 5 mm. Hg.

To a 30 g. of the aforeprepared ethyl-4-trimethylsilyl-cyclohexylidenecyanoacetate dissolved in 200 ml. of ethyl alcohol was added 18 g. of potassium cyanide dissolved in 40 ml. of water. This addition was carried out over a 1 minute time period. The resulting mixture was allowed to stand at room temperature for 1–3 days. Then the ethyl alcohol solvent was stripped by distillation. The residue was refluxed with 500 ml. of concentrated hydrochloric acid for 1 week. The resulting reaction mixture was cooled to 10° C. by use of ice. The cooled mixture was subjected to filtering, and the precipitate was washed with 100 ml. of water. The resulting crude product was dissolved in 500 ml. of saturated potassium bicarbonate solution and then filtered. To the filtrate was added sufficient 10% hydrochloric acid to precipitate product. The precipitate, 18 g., was recrystallized from ethyl acetate to provide 12 g. of substantially pure 4-trimethylsilylcyclohexane-1-carboxy-1-acetic acid having a melting point of 174–175° C.

10 g. of the aforeprepared acid was then dissolved in 50 ml. of acetic anhydride. This combination was refluxed for 1 hour. The resulting mixture was subjected to a vacuum to remove excess acetic acid. The resulting product (9 g.) was the anhydride of the acid prepared in the previous paragraph, the anhydride being formed between the carboxylic acid groups of each individual molecule.

To 7 g. of this anhydride (finely powdered) was added 3.5 g. of dimethylaminopropylamine. This mixture was maintained at 180–200° C. for 1 hour. The mixture was then cooled to 20° C. The cooled mixture was subjected to distillation to recover 8.5 g. of substantially pure N-dimethylaminopropyl - 8 - trimethylsilyl - 2 - azaspiro[5:4]decane-1,3-dione having a boiling point ranging from 145–155° C. at 0.016 mm. Hg.

EXAMPLE 3

Preparation of N-dimethylaminopropyl-8,8,8-trimethyl-8-silyl-2-azaspiro[5:4]decane and demonstration of its cytotoxic activity 8 g. of the dione product of Example 2 was dissolved in anhydrous diethyl ether. The resulting solution was added to a solution of 5 g. of lithium aluminum hydride in 500 ml. of anhydrous diethyl ether. The resulting mixture was stirred for 4 hours without the application of an external heat source. After the 4 hour stirring period, the mixture was decomposed by the addition of 20 ml. of water. The resulting mixture was filtered. The ethereal filtrate was dried utilizing anhydrous sodium sulfate. The ether solvent was then removed by distillation. The residue was distilled to provide 6 g. of substantially pure N - dimethylaminopropyl - 8,8,8 - trimethyl-8-silyl-2-azaspiro[5:4]decane. This product had a boiling point of 100° C.–106° C. at 0.02 mm. Hg.

This compound was tested in both KB and mammary cancer cell cultures and displayed an activity of 1 microgram per ml. of culture. The dimethiodide of the above decane compound was prepared by treating the product with an ethyl alcohol solution of methyl iodide followed by precipitation of the salt with ether. The resulting dimethiodide had a melting point of 288° C.–290° C., and exhibited potent ganglionic blocking activity and produced marked hypotension in hypertensive dogs at very low doses, i.e., 10 mg./kilo (body weight of the dog).

Examples of other compounds within the scope of the present invention include N-diethylaminoethyl-8,8,8-triethyl - 8 - silyl-2-azaspiro[5:4]decane, N-piperidinoethyl-8,8,8-dimethyl-8-ethyl - 8 - silyl-2-azaspiro[5:4]decane, N - diallylaminobutene - 2 - (8,8,8-triethyl-8-silyl)-2-azaspiro[5:4]decane, and N-pyrrolidinopropyl-8,8,8-triethyl-8-silyl-2-azaspiro[5:4]decane.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A compound of the formula:

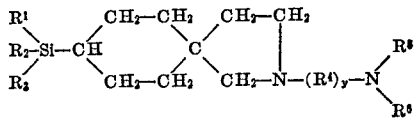

wherein:

$R^1$, $R^2$ and $R^3$ are the same or different methyl or ethyl groups $R^4$ = alkylene or alkenylene $R^5$ and $R^6$ are the same or different lower alkyls having 1–4 carbon atoms, lower alkenyls having 3–4 carbon atoms, or cyclicized together form a heterocyclic group selected from morpholino, pyrrolidino, piperidino and lower alkyl (1–4 carbon atoms) piperazino in which said lower alkyl is attached to a terminal nitrogen atom, and $y$ = 2–6 when $R^4$ is alkylene and 3–4 when $R^4$ is alkenylene.

2. N-dimethylaminopropyl - 8,8,8 - trimethyl-8-silyl-2-azaspiro[5:4]decane-1,3-dione.

3. N-dimethylaminopropyl - 8,8,8 - trimethyl-8-silyl-2-azaspiro[5:4]decane.

4. A compound of the structural formula:

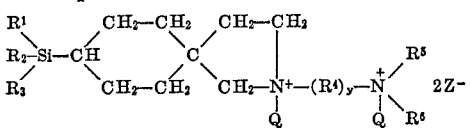

wherein:

$R^1$, $R^2$ and $R^3$ are the same or different methyl or ethyl groups $R^4$ = alkylene or alkenylene $R^5$ and $R^6$ are the same or different lower alkyl having 1–4 carbon atoms, lower alkenyls having 3–4 carbon atoms, or cyclicized together form a heterocyclic group selected from morpholine, pyrrolidino, piperidino and lower alkyl (1–4 carbon atoms) piperazino in which said lower alkyl is attached to a terminal nitrogen atom, $y$ = 2–6 when $R^4$ is alkylene and 3–4 when $R^4$ is alkenylene Q = hydrogen, lower alkyl of 1–4 carbon aoms or alkenyl of 3–4 carbon atoms and Z = a non-toxic, pharmaceutically acceptable anion.

References Cited

UNITED STATES PATENTS 3,432,499   3/1969   Rice et al. _____ 260—247.5

JOHN D. RANDOLPH, Primary Examiner

U.S. Cl. X.R.

260—247.5 R, 293.66, 268 BF, 326.85, 343.3, 448.2 R, 999